United States Patent [19]
Bremer et al.

[11] Patent Number: 5,163,771
[45] Date of Patent: Nov. 17, 1992

[54] FULL ENGAGEMENT INTERLOCKING

[76] Inventors: Paul W. Bremer; Randall A. Barr, both of 4801 Dawin Rd., Jacksonville, Fla. 32207

[21] Appl. No.: 780,974

[22] Filed: Oct. 23, 1991

[51] Int. Cl.⁵ .............................................. F16C 11/00
[52] U.S. Cl. ....................................... 403/97; 403/359; 403/380
[58] Field of Search .......................... 403/359, 380, 97

[56] References Cited

U.S. PATENT DOCUMENTS

| Re. 20,270 | 2/1937 | Matthews et al. | 403/359 X |
| 1,541,007 | 6/1925 | Thiemer | 403/359 X |
| 1,779,805 | 10/1930 | Dunwoodie | 403/359 |
| 3,819,402 | 4/1989 | Schneider | 403/359 X |
| 4,620,530 | 11/1986 | Lanier | 128/75 |
| 4,913,135 | 4/1990 | Mattingly | 128/78 |

FOREIGN PATENT DOCUMENTS

| 684196 | 9/1979 | U.S.S.R. | 403/359 |
| 931707 | 7/1963 | United Kingdom | 403/359 |

OTHER PUBLICATIONS

Bremer Orthopedics Brochure "Halo Vest"; 1987.

*Primary Examiner*—Andrew V. Kundrat
*Attorney, Agent, or Firm*—Nixon & Vanderhye

[57] ABSTRACT

Interlocking surface elements are created in such a way that there is almost 100% engagement between the surfaces, so that they positively lock together, and will not cam with respect to each other. Each element comprises a number of uniformly dimensioned semi-conically shaped surfaces emanating from a common center and disposed in an alternating inverted configuration. Each surface has first and second edges extending in a longitudinal direction. A flat surface of substantially constant dimension in a plane substantially perpendicular to the longitudinal direction connects the first and second edges of adjacent, alternately inverted, semi-conically shaped surfaces, so as to maximize the engagement area between the elements. The elements may be of vacuum formed plastic, molded plastic, or metal stampings. They may be circular (e.g. disc shaped) in plan, and the semi-conically shaped surfaces may all be hollow.

20 Claims, 2 Drawing Sheets

FULL ENGAGEMENT INTERLOCKING

BACKGROUND AND SUMMARY OF THE INVENTION

There are many circumstances in which it is necessary to provide a positive interlocking relationship between circular elements, or circle segment shaped elements. For example for adjustments for bicycle seats, halo supporting structures for orthopedic procedures, and the like (such as shown in U.S. Pat. Nos. 4,620,530 and 4,913,135, the disclosures of which are hereby incorporated by reference herein). Typically, because of the constraints in manufacture of these components, the surfaces thereof which are designed to mate do not mate over a significant area. As a matter of fact, often the area of mating can be less than 25%. This requires the use of higher quality materials than would otherwise be necessary in order properly hold the surfaces in the particular relative positions to which they have been moved, or poor locking performance results.

According to the present invention, a particular geometrical configuration of the inter-engaging surfaces of interlocking elements is provided which maximizes the engagement area between two cooperating surfaces. Utilizing the geometric configuration according to the invention, it is possible to obtain almost 100% engagement between two cooperating surfaces. This allows the interlocking elements to be constructed of less expensive materials, to be smaller, and/or to provide a better interlocking engagement.

The geometrical configuration according to the present invention that results in the advantages set forth above, and overcomes a longstanding problem in the art with respect to interlocking elements, comprises a plurality of semi-conically shaped surfaces emanating from a common center and disposed in an alternating inverted configuration, and having first and second edges extending in a longitudinal direction. An alternating inverted configuration can be obtained by bisecting a conically shaped element longitudinally, and then translocating the bisected portion so that only one edge of each of the bisected portions is aligned (in a plane perpendicular to the bisecting plane).

The geometrical configuration according to the invention also comprises means for effecting substantially 100% engagement between cooperating conically shaped alternately inverted surfaces. Such means typically comprises a flat surface of substantially constant dimension in a plane substantially perpendicular to the longitudinal direction, and connecting the first and second edges of adjacent alternately inverted semi-conically shaped surfaces. These flat surfaces typically have a dimension perpendicular to the longitudinal direction of about 10-40% of the maximum cross-sectional dimension of the semi-circular conically shaped elements.

The geometric surfaces according to the present invention may be provided in a number of different configurations. For example they may be provided as a circle, a segment of a circle, or a semi-circle, in plan. Alternatively, the conically shaped surfaces may be truncated so as to form a disc, or part of a disc, in plan. The conically shaped surfaces can be hollow, or at least half of the conically shaped surfaces are hollow.

The geometric surfaces according to the invention can be utilized in forming a wide variety of elements for a number of functions. For example if elements according to the invention are formed by cold flow metal stampings techniques, they may be used for bicycle seats or the like. Alternatively elements can be molded of plastic, or vacuum formed from plastic, to provide adjustment components associated with halo supporting structures and like orthopedic devices. In fact, the elements according to the invention can be used in essentially any environment where it is necessary to provide a detachable and adjustable yet positive locking engagement between a pair of elements so that they do not rotate with respect to each other, and in a simple yet effective manner.

DETAILED DESCRIPTION OF THE DRAWINGS

Figure 1:
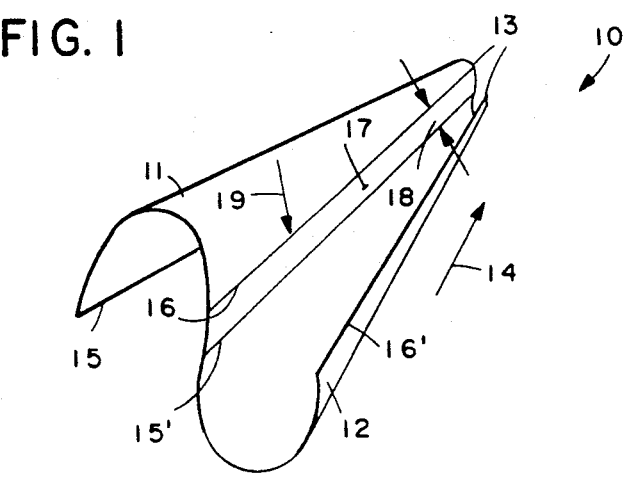
FIG. 1 is a perspective view showing the basic geometric configuration of a pair of semi-conically shaped surfaces, with flat surface therebetween, disposed in an alternately inverted configuration, which is the basic geometric configuration utilized in the practice of the invention.

In FIG. 1, illustrated generally by reference numeral 10, is a representation of the basic geometric shape that is utilized in the practice of the present invention. The shape is formed, conceptually, by bisecting a cone (or a truncated cone) longitudinally to form two semi-circular conically shaped surfaces 11, 12, emanating from a common center 13 (originally having a common tip). Bisecting takes place in the direction of arrow 14, and the surface 11 is formed with first and second edges 15, 16, and the surface 12 with first and second edges 15', 16'. Prior to bisecting, the edges 15, 15' were contiguous (formed a contiguous surface), as were the edges 16, 16'. After translocation to the position illustrated in FIG. 1, the edges 16, 15' are spaced in alignment with each other in a plane perpendicular the to bisecting plane extending in the direction 14. The direction 14 is the longitudinal direction in which the edges 15, 15', 16, and 16' extend Another part of the basic geometric configuration according to the invention is the flat surface 17 which has a substantially constant height 18 in the direction 19 substantially perpendicular to the direction 14.

Utilizing the basic conceptual geometric configuration illustrated at 10 in FIG. 1, an element, such as the element 20 (see FIG. 2) according to the present invention may be constructed. The element 20 comprises a plurality of conically shaped surfaces or surface portions 21, 22 disposed in an alternately inverted configuration The term "alternately inverted" as used in the present specification and claims means each alternate conically shaped 22 is the same as, but inverted with respect to, the adjacent conically shaped surfaces 21. Each surface 21, 22 has first and second edges 23, 24 extending in a longitudinal direction, to a common center 25.

In order to prevent camming action between two like elements 20 when they are interlocking with each other, the flat surfaces 26 are provided extending between cooperating edges 23, or 24, of adjacent surfaces or surface portions 21, 22. The flat surfaces 26 have a dimension 27 in a plane perpendicular to the direction of elongation of the edges 23, 24. The dimension 27 is substantially constant in height along its entire length. The height (dimension 27) of the surface 26 will be chosen depending upon the particular materials, the shape, in plan, of the element 20, and considering a wide variety of other criteria. Typically, however, the dimension 27 will be approximately 10–40% of the maximum cross-sectional dimension of a surface 21, 22 (i.e. 10–40% of the dimension 29 for the embodiment illustrated in FIG. 2). The closer the dimension 27 is to exact uniformity over the entire length of the surface 26, the closer the element 20 will be to maximum (i.e. 100%) inter-engagement between cooperating surfaces when a pair of the elements 20 are interlocked with each other.

Figure 3:
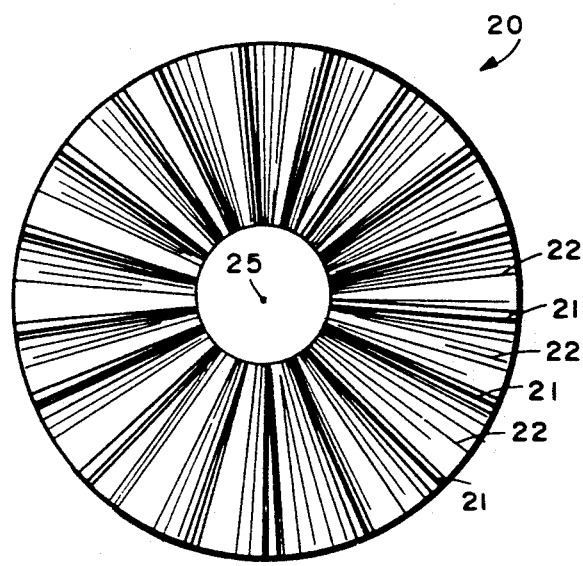
FIG. 3 is a top plan view of the element of FIG. 2.
Figure 2:
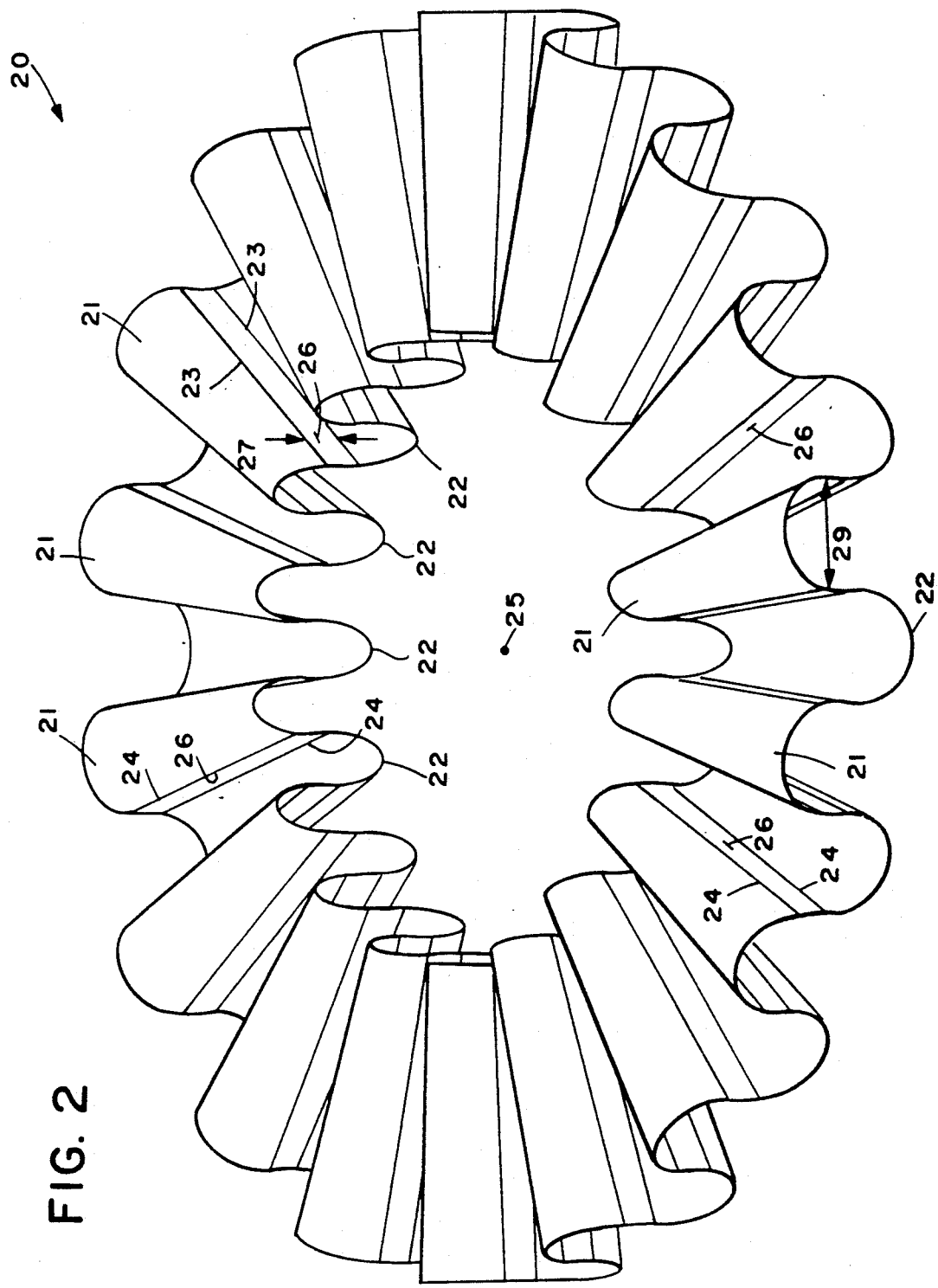
FIG. 2 is a top perspective view of an exemplary disc shaped interlocking element according to the present invention.

For the particular embodiment illustrated in FIGS. 2 and 3, the element 20 is circular in plan, and more specifically is disc shaped in plan (the conically shaped elements 21, 22 thereof being truncated). Also for this particular embodiment the conically shaped surfaces 21, 22 are hollow. However this is not necessary, and under some circumstances half of the surfaces 21, 22 will not be hollow (e.g. the half defined by surfaces 21). Because of the particular geometry, an even number of surfaces 21, 22 will be provided in the element 20.

Figure 4:
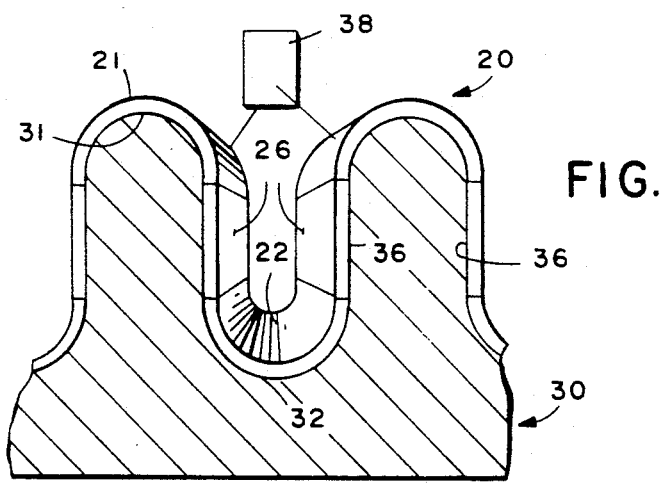
FIG. 4 is a side view, partly in cross-section and partly in elevation, of a detail of two interlocking elements according to the invention showing the manner in which they interlock.

FIG. 4 illustrates the cooperation between the element 20 and a like element 30 having surface portions thereof essentially identical to the surface portions 21, 22, 26 of the element 20. That is, the element 30 has first and second conically shaped surfaces 31, 32, and intermediate flat surfaces 36. Note in this embodiment, however, that the surfaces 31 are not hollow, and extend upwardly into the hollow interior of the surfaces 21, while the surfaces 32 are hollow and receive the surfaces 22 therein. The flat surfaces 26 of the element 20 engage the flat surfaces 36 of the element 30, thereby preventing any camming action between the elements 20, 30 should they be subjected to a relative rotational force. Note that the element 30 may be a structural component, while the element 20 is connected up to any other type of structure, shown schematically by box 38 in FIG. 4. For example the structure 30 could be one component of a bicycle seat adjustment interlock, while the element 20 can provide the other component and be ultimately connected to the bicycle seat as the structure 38, or to a like structural component.

The elements 20, 30 according to the present invention may be made of a wide variety of materials. Most desirably they are made of molded plastics, which do not lend themselves to fine detail. Alternatively they may be constructed of vacuum formed plastics, or may be metal stampings (e.g. cold flow metal stampings).

It will thus be seen that according to the present invention an interlocking relationship between elements is provided which ensures almost complete, 100% inter-engagement between the components of the interlock, ensuring that they positively lock even if relatively inexpensive materials are utilized, or the elements are relatively small, or only segments of circles, or semi-circular, rather than circular or disc shaped.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A pair of interlocking elements each element comprising:
   a plurality of semi-conically shaped surfaces emanating from a common center and disposed in an alternately inverted configuration, and each having first and second edges extending in a longitudinal direction; and
   a flat surface, of substantially constant dimension, in a plane substantially perpendicular to said longitudinal direction, and terminating in the first and second edges of adjacent alternately inverted, semi-conical surfaces, so as to maximize the engagement area between the elements.

2. A pair of elements as recited in claim 1 wherein said plurality of semi-conically shaped surfaces of at least one of said elements are hollow.

3. A pair of elements as recited in claim 2 wherein said constant dimension, of said flat surface in a plane perpendicular to said longitudinal direction, is approximately 10–40% of the largest cross-sectional dimension of said semi-conically shaped surfaces.

4. A pair of elements as recited in claim 1 wherein said constant dimension, of said flat surface in a plane perpendicular to said longitudinal direction, is approximately 10–40% of the largest cross-sectional dimension of said semi-conically shaped surfaces.

5. A pair of interlocking elements as recited in claim 1 wherein said at least one of said elements is circular in plan.

6. A pair of interlocking elements as recited in claim 3 wherein at least one of said elements is disc shaped in plane.

7. A pair of interlocking elements as recited in claim 1 wherein said elements are made of a material selected form the group consisting essentially of molded plastics, vacuum formed plastics, and cold flow metal stampings.

8. A generally disc shaped element having a center about which it is substantially symmetrical, and having:
   at least one surface comprising a plurality of uniformly dimensioned semi-conically shaped surface portions emanating from said center, and disposed in an alternately inverted configuration, and having first and second edges extending in a longitudinal direction; and
   a flat surface, of substantially constant dimension, in a plane substantially perpendicular to said longitudinal direction, and terminating in the first and second edges of adjacent, alternately inverted, semi-conically shaped surface portions.

9. A disc shaped element as recited in claim 8 constructed of molded plastic.

10. A disc shaped element as recited in claim 8 constructed of vacuum formed plastic.

11. A disc shaped element as recited in claim 8 constructed as a metal stamping.

12. An element as recited in claim 8 wherein said semi-conically shaped surfaces are hollow.

13. An element as recited in claim 8 Wherein said constant dimension in a plane substantially perpendicular to said longitudinal direction is approximately 10–40% of the largest cross-sectional dimension of any semi-conically shaped surface.

14. A shaped element comprising at least a circular segment in plan, and having:
- at least one surface comprising a plurality of uniformly dimensioned semi-conically shaped surface portion from a common center and disposed in an alternately inverted configuration, and having first and second edges; and
- means for effecting substantially 100% engagement between at least a plurality of said surface portions and corresponding surface portions of an identically shaped element.

15. An element as recited in claim 14 wherein said first and second edges extend in a longitudinal direction, and wherein said means for effecting substantially 100% engagement comprises a flat surface, of substantially constant dimension, disposed in a plane substantially perpendicular to said longitudinal direction, and terminating in the first and second side edges of adjacent, alternately inverted, semi-conically shaped surface portions.

16. An element as recited in claim 14 wherein said dimension in a plane substantially perpendicular to said longitudinal direction is approximately 10-40% of the largest cross-sectional dimension of any semi-conically shaped surface.

17. An element as recited in claim 14 herein said semi-conically shaped surfaces are hollow and truncated.

18. An element as recited in claim 14 wherein said element is formed of a material selected from the group consisting essentially of molded plastics, vacuum formed plastics, and cold flow metal stampings.

19. A pair of interlocking elements as recited in claim 1 wherein said semi-conically shaped surfaces are truncated.

20. An element as recited in claim 8 wherein said semi-conically shaped surfaces are truncated.

* * * * *